United States Patent
Hong

(10) Patent No.: US 8,940,080 B2
(45) Date of Patent: Jan. 27, 2015

(54) DUST FILTER ASSEMBLY ATTACHABLE TO OFFICE EQUIPMENT

(75) Inventor: Sung-Jun Hong, Seoul (KR)

(73) Assignee: LG Hausys, Ltd., Seoul (KR)

( * ) Notice: Subject to any disclaimer, the term of this patent is extended or adjusted under 35 U.S.C. 154(b) by 246 days.

(21) Appl. No.: 13/578,939

(22) PCT Filed: Jan. 11, 2011

(86) PCT No.: PCT/KR2011/000189
§ 371 (c)(1),
(2), (4) Date: Aug. 14, 2012

(87) PCT Pub. No.: WO2011/102604
PCT Pub. Date: Aug. 25, 2011

(65) Prior Publication Data
US 2012/0304864 A1 Dec. 6, 2012

(30) Foreign Application Priority Data
Feb. 22, 2010 (KR) .................. 10-2010-0015553

(51) Int. Cl.
B03C 3/01 (2006.01)
B01D 46/10 (2006.01)
B01D 46/00 (2006.01)
B01D 46/52 (2006.01)

(52) U.S. Cl.
CPC ............ *B01D 46/10* (2013.01); *B01D 46/0032* (2013.01); *B01D 46/521* (2013.01); *B01D 2275/10* (2013.01); *B01D 2279/45* (2013.01)
USPC .......................................... 96/55

(58) Field of Classification Search
CPC . B01D 46/10; B01D 46/0005; B01D 2271/02
See application file for complete search history.

(56) References Cited

U.S. PATENT DOCUMENTS

| 5,462,569 A | 10/1995 | Benjamin |
| 5,954,846 A * | 9/1999 | Chowdhury et al. ........ 55/385.1 |
| 7,341,613 B2 * | 3/2008 | Kirsch ............................ 55/495 |
| 2002/0185008 A1 | 12/2002 | Anderson et al. |

FOREIGN PATENT DOCUMENTS

| DE | 20 2008 007714 U1 | 9/2008 |
| EP | 0599436 A1 | 6/1994 |

(Continued)

OTHER PUBLICATIONS

Korean Patent Application No. 120090148934, Notice of Allowance dated Apr. 19, 2013, two(2) pages.

(Continued)

*Primary Examiner* — Robert Clemente
*Assistant Examiner* — Joubert X Glover
(74) *Attorney, Agent, or Firm* — Nath, Goldberg & Meyer; Joshua B. Goldberg; Katelyn J. Bernier

(57) ABSTRACT

The present invention relates to a dust filter assembly attachable to office machines such as printers and copiers that employs toner, and computers and fax machines that require cooling. The dust filter assembly includes a contact plate attached to a vent hole of an office machine and sealing the periphery of the vent hole, a filter case connected to the contact plate and having a filter accommodation space, and a filter disposed in the filter case and including a plurality of layers, at least one of which is charged with static electricity.

12 Claims, 2 Drawing Sheets

(56) References Cited

FOREIGN PATENT DOCUMENTS

| | | | | |
|---|---|---|---|---|
| FR | 2776568 | A1 | 10/1999 | |
| JP | 53-048158 | A | 5/1978 | |
| JP | 53-85853 | A | 7/1978 | |
| JP | 58-6721 | U | 1/1983 | |
| JP | 58-036613 | A | 3/1983 | |
| JP | 58-088265 | A | 5/1983 | |
| JP | 59-45059 | U | 3/1984 | |
| JP | 2-20911 | U | 2/1990 | |
| JP | H0389910 | A | 4/1991 | |
| JP | 3-69420 | U | 7/1991 | |
| JP | H04367703 | A | 12/1992 | |
| JP | H0929041 | A | 2/1997 | |
| JP | H11152170 | A | 6/1999 | |
| JP | 2000191079 | A | 7/2000 | |
| JP | 2003510174 | A | 3/2003 | |
| JP | 2003-311111 | A | 11/2003 | |
| KR | 10-2005-0028008 | A | 3/2005 | |
| KR | 10-2005-0030662 | A | 3/2005 | |
| KR | 1020050028008 | * | 3/2005 | B01D 39/00 |
| KR | 20070000074 | A | 1/2007 | |
| KR | 100695873 | B1 | 3/2007 | |
| KR | 10-2009-0083512 | A | 8/2009 | |
| KR | 20-2009-0010097 | U | 10/2009 | |
| TW | 258054 | | 9/1995 | |
| TW | M253197 | | 12/2003 | |
| TW | 200735950 | U1 | 10/2007 | |
| TW | M360076 | U1 | 7/2009 | |
| WO | 2008151721 | A1 | 12/2008 | |

OTHER PUBLICATIONS

European Patent Application No. 11744846.4, Extended Search Report dated Jul. 2, 2013, six(6) pages.

Taiwanese Patent Application No. 10220903770, Office Action dated Jul. 9, 2013, Five(5) pages.

Japanese Patent Application No. 2012-551905, Office Action dated Aug. 27, 2013, two(2) pages.

European Patent Application No. 11744846.4, Office Action dated Feb. 27, 2014, four(4) pages.

Japanese Patent Application No. 2012-551905, Office Action dated Mar. 18, 2014, two(2) pages.

\* cited by examiner

DUST FILTER ASSEMBLY ATTACHABLE TO OFFICE EQUIPMENT

TECHNICAL FIELD

The present invention relates to a filter assembly which is attached to a vent hole or an intake hole of an office machine, including a computer or a printing apparatus, such as a printer, copier, and the like, which employ toner, to collect dust in the office machine or to collect dust from air introduced into the office machine. More particularly, the present invention relates to a dust filter assembly which can be attached to outer surfaces of office machines having various shapes.

BACKGROUND ART

Generally, electrophotographic printers are classified, according to a developing manner, into a dry type electrophotographic printer, which employs powdered toner as a developer, and a wet type electrophotographic printer, which employs a mixture of toner and a liquid carrier such as noppar. In both types of electrophotographic printer, toner is supplied to a photosensitive medium, such as a photosensitive drum having an electrostatic latent image formed thereon, to form a certain image, and a sheet of paper is passed through a transfer medium rotated in contact with the photosensitive drum so that the developed image is printed on the sheet of paper.

Since the dry type electrophotographic printer employs powdered toner, it generates harmful toner dust due to the powdered toner.

However, since most printers and copiers currently available on the market are not provided with a suitable device for recovering toner dust, the fine toner dust is discharged to the outside through an exhaust hole.

In addition, since an office machine such as a computer is formed with an intake hole through which air is introduced into the office machine to cool the office machine, foreign matter such as dust is also introduced into and deposited inside the office machine therethrough, causing malfunction or failure of the office machine.

DISCLOSURE

Technical Problem

The present invention is directed to providing a dust filter assembly, which may effectively adsorb toner dust in a dry type printer or a copier to prevent the toner dust from being discharged from the dry type printer or the copier.

In addition, the present invention is directed to providing a dust filter assembly, which may effectively remove dust introduced into an office machine such as a computer, fax machine or the like through an intake hole thereof.

Further, the present invention is directed to providing a dust filter assembly, which may be brought into close contact with outer peripheral surfaces of office machines having various shapes.

Further, the present invention is directed to providing a dust filter assembly, which may facilitate replacement of a filter.

Technical Solution

One aspect of the present invention provides a dust filter assembly attachable to an outer surface of an office machine, which includes a contact plate attached to a vent hole of an office machine and sealing the periphery of the vent hole; a filter case connected to the contact plate and having a filter accommodation space therein; and a filter received within the filter case and including a plurality of layers, at least one of which is charged with static electricity.

The contact plate may be formed of ethylene propylene terpolymers (EPDM). The contact plate may be press-fitted into the filter case or may be integrally formed with the filter case.

The filter case may be divided into a front case and a rear case, which may be press-fitted into each other.

The front case may be provided at a corner thereof with an L-shaped insertion protrusion extending towards the rear case, and the rear case may be provided at a corner thereof with a mounting groove which receives the insertion protrusion.

The rear case may be provided at one side thereof with a coupling hole, and the front case may be provided at one side thereof with a pressing protrusion extending towards the rear case to be inserted into the coupling hole.

The contact plate may be integrally formed with the rear case by insert injection molding.

The contact plate may be provided at a rear side thereof with a sealing wing which has a thickness gradually decreasing towards an edge of the contact plate.

The sealing wing may constitute a closed cross-section, which has an area gradually increasing towards a lower end of the contact plate.

The contact plate may include an attachment member inside the sealing wing, and the attachment member may have a lower height than the sealing wing.

The attachment member may be formed of at least one selected from among bonding agents, adhesives, double-sided tapes, and magnets.

Advantageous Effects

According to the present invention, a dust filter assembly attachable to outer surfaces of office machines is brought into contact with a vent hole of a printer or copier having various shapes, or with an intake hole of a computer, fax machine, or the like to prevent toner dust from being discharged from the printer or the copier, or to prevent foreign matter from being introduced into such office machines. With this configuration, the dust filter assembly may prevent malfunctioning or failure of the office machines while extending a cleaning or repair cycle.

In addition, the dust filter assembly attachable to outer surfaces of office machines according to the present invention is brought into contact with a rounded periphery of the vent hole, and thus may be applied to printers and copiers having various shapes.

Further, the dust filter assembly attachable to outer surfaces of office machines according to the present invention includes activated carbon therein, thereby enabling purification of toxic gas generated during operation of the office machines.

BEST MODE

Figure 1:
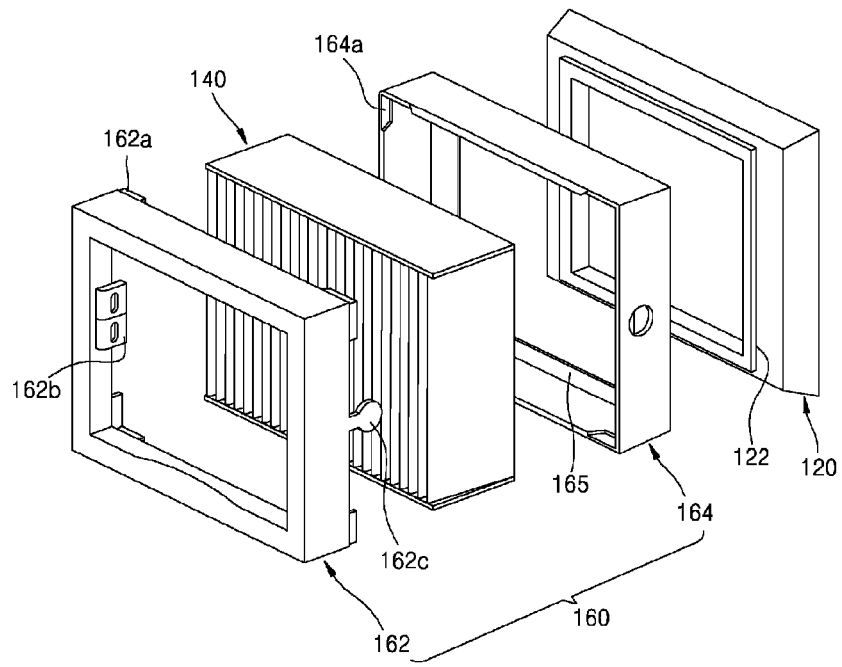
FIG. 1 is an exploded perspective view of a dust filter assembly attachable to outer surfaces of office machines according to one embodiment of the present invention.

Embodiments of the present invention will now be described in more detail with reference to the accompanying drawings.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

In the drawings, the sizes and relative sizes of elements may be exaggerated for clarity. Further, it will be understood that when a certain element is referred to as being "present inside" or "connected to" another element, the certain element can adjoin the other element or can be separated from the other element. When the element is separated from the other element, it should be understood that an intervening element can also be present to secure or connect the certain element to the other element even without a description thereof in the specification.

Figure 2:
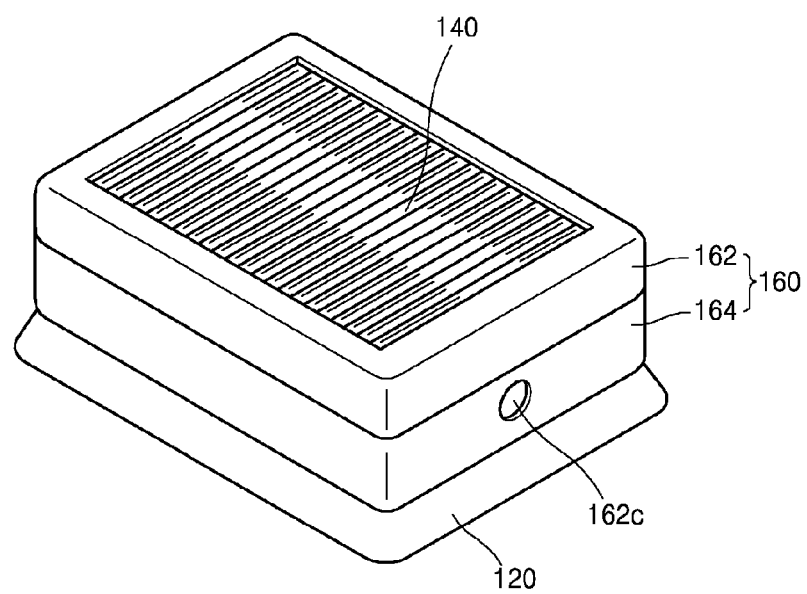
FIG. 2 is a perspective view of the dust filter assembly according to the embodiment of the present invention.

FIG. 1 is an exploded perspective view of a dust filter assembly attachable to outer surfaces of office machines according to one embodiment, and FIG. 2 is a perspective view of the dust filter assembly according to the embodiment.

As shown in the drawings, the dust filter assembly attachable to outer surfaces of office machines according to the embodiment includes a contact plate 120 brought into close contact with a vent hole of an office machine, a filter case 160 coupled to the contact plate 120 and receiving a filter 140 therein, and a filter 140 detachably received within the filter case 160 and adsorbing toner dust or foreign mater floating in air via static electricity.

The filter case 160 defines a space for receiving the filter 140 and generally has a frame shape.

In addition, the filter case 160 is divided into a front case 162 and a rear case 164, which may be detachably press-fitted into each other. The filter 140 is secured between the front case 162 and the rear case 164. Here, in order to facilitate replacement of the filter 140, the front and rear cases 162, 164 may be easily attached to or detached from each other without using a separate tool.

For this configuration, the front case 162 is formed at four corners thereof with "L"-shaped insertion protrusions 162a, and the rear case 164 is formed at four corners thereof with mounting grooves 164a corresponding to the insertion protrusions 162a.

When the front case 162 is fitted into the rear case 164, the insertion protrusions 162a are respectively inserted into the mounting grooves 164a, thereby sealing the four corners of the front case 162 and the rear case 164.

Further, the front case 162 is formed at one side thereof with a hook 162b. The hook 162b is inserted into one side of the rear case 164 to support the rear case 164 in a direction of pushing the rear case 164 outwards such that the side surface of the rear case 164 becomes coplanar with the side surface of the front case 162.

The front case 162 is formed at the other side thereof with a pressing protrusion 162c and the rear case 164 is formed with a coupling hole 164c corresponding to the pressing protrusion 162c.

When coupling the front case 162 to the rear case 164, part of the pressing protrusion 162c is caught by the coupling hole 164c and exposed to the outside. When separating the front and rear cases 162, 164 from each other, the pressing protrusion 162c is pressed into the front case through the coupling hole 164c and the front case 162 is pulled out of the rear case 164.

Both the front case 162 and the rear case 164 have a frame shape, which is formed at the center thereof with a through-hole and sealed at side surfaces thereof.

Figure 3:
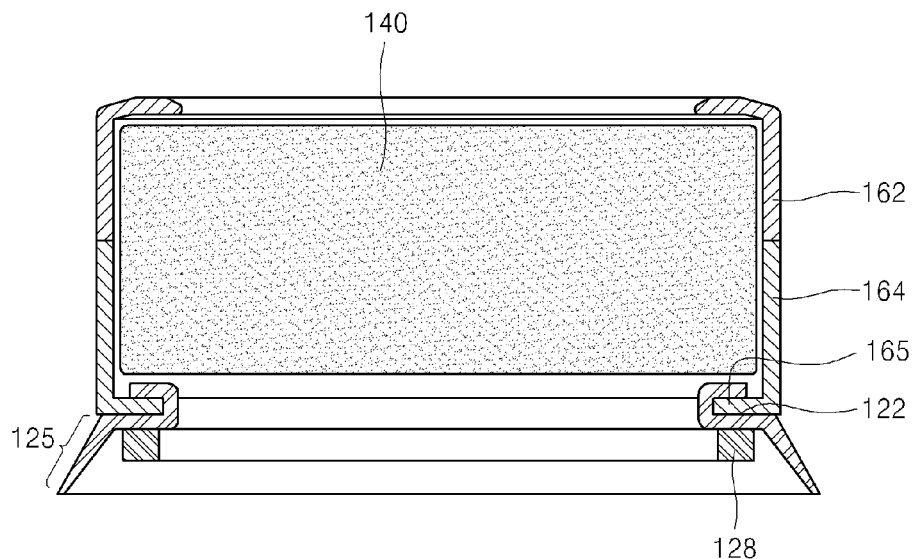
FIG. 3 is a cross-sectional view of the dust filter assembly according to the embodiment of the present invention.

FIG. 3 is a cross-sectional view of the dust filter assembly attachable to outer surfaces of office machines according to the embodiment of the present invention.

As shown in the drawings, the side surfaces of the front and rear cases 162, 164 are coupled to each other to seal the side surfaces of the filter assembly, so that air introduced into the filter assembly through the contact plate 120 can be discharged through the filter 140 in the filter assembly.

The contact plate 120 is press-fitted into the rear case 164. For this configuration, the contact plate 120 is formed at a front side thereof with substantially C-shaped fitting grooves 122. The fitting grooves 122 are fitted into a rear frame 165, which is disposed at the rear of the rear case 164 and has a frame shape.

The contact plate 120 is brought into contact with the surface of a printer or copier to prevent toner from being discharged through a gap between the contact plate 120 and the surface of the printer or copier, and may be made of a resilient material.

Further, in order to have adaptability with respect to the outer shape of the printer or the copier, the contact plate may be formed of a flexible material, the shape of which can be varied according to the outer shape of the printer or the copier.

The entirety of the contact plate 120 may be made of a resilient material, for example, ethylene propylene terpolymers (EPDM).

EPDM is a synthetic rubber composed of ethylene, propylene and non-conjugated diene, and may be vulcanized with sulfur, peroxide, phenol resin, radiation, or the like. Particularly, diene is added to ensure sulfur vulcanization. EPDM exhibits excellent properties in terms of ozone-resistance, weather resistance, heat resistance and solvent resistance, and has a lower specific gravity than other synthetic resins and allows high loading capacity of fillers, oil and the like, thereby providing excellent economic feasibility.

In this embodiment, the contact plate 120 is press-fitted into the rear case 164. Alternatively, the contact plate 120 may be integrally formed with the rear case 164. In this case, the contact plate 120 may be integrally formed with the rear case 164 via insert injection molding.

The contact plate 120 serves to seal a gap between the vent hole of the office machine and the rear case 164. Here, the contact plate 120 is press-fitted to the rear case 164 and is joined to the vent hole of the printer via bonding agents, adhesives, double-sided tapes, magnets, or the like.

The contact plate 120 is provided at a lower side thereof with a sealing wing 125. The sealing wing 125 has a thickness gradually decreasing towards an edge thereof and an area gradually increasing towards a lower side thereof so as to be brought into close contact with the vent hole of the printing device.

Further, the contact plate 120 is provided at a lower portion thereof with an attachment member 128, which will be coupled to the vent hole of the office machine. The attachment member 128 may be located above the sealing wing 125 such that the sealing wing 125 is resiliently deformed and brought into close contact with a surface of the vent hole of the office machine, when the attachment member 128 is coupled to the vent hole of the office machine.

The attachment member 128 may be provided with bonding agents, adhesives, double-sided tapes, or the like on the surface thereof to secure the contact plate 120 to the vent hole of the office machine via bonding force or adhesion. Alternatively, in the case where the vent hole of the office machine is formed of a metallic material, the attachment member 128 is provided with a magnet to secure the contact plate 120 to the vent hole of the office machine via magnetic force.

Figure 4:
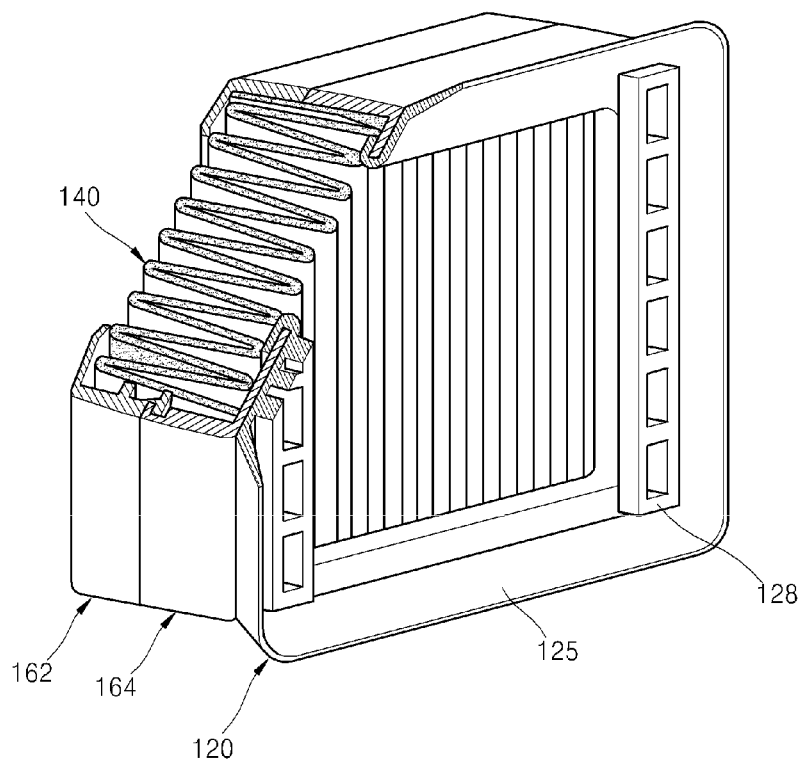
FIG. 4 is a perspective view of the dust filter assembly according to the embodiment of the present invention, showing a partial section of the dust filter assembly.

FIG. 4 is a perspective view of the dust filter assembly attachable to outer surfaces of office machines according to the embodiment of the present invention, showing a partial section of the dust filter assembly.

The filter 140 may be folded several times to secure a contact area with air including toner dust and may be formed of nonwoven fabrics.

The filter 140 may have a plurality of layers, each of which is formed with pores having a different size than that of pores in another layer. Herein, the term "pore" means a hole through which particles pass.

In the case where the filter 140 includes the plurality of layers and each of the layers is formed with pores having a different size than that of pores in another layer, a layer adjacent to the contact plate 120 may be formed with pores having the largest size, and a layer located farthest from the contact plate 120 may be formed with pores having the smallest size.

The pores may have a size ranging from 0.1 µm to 5 µm. Since toner dust generally has a particle size of about 0.1 µm, pores having an excessively small size can cause overheating of the office machine due to an increase in resistance against gas discharge, and pores having an excessively large size can deteriorate dust collection performance.

At least one of the plural layers constituting the filter 140 may be charged with static electricity. With this configuration, the filter 140 may adsorb toner particles via static electricity, thereby improving dust collection performance.

When the filter is charged with static electricity, the filter may effectively collect dust particles having a smaller size than those of the pores, improving dust collection performance without increasing resistance against air discharge.

Further, the filter 140 may include activated carbon. In this case, toxic gas possibly generated during operation of the office machine may be purified by the activated carbon.

Although some exemplary embodiments of the present invention have been described with reference to the accompanying drawings, the invention may be embodied in many different ways and should not be construed as being limited to the embodiments set forth herein. It will be understood by those skilled in the art that various modifications, changes, alterations, and equivalent embodiments can be made without departing from the spirit and scope of the invention. Therefore, it should be appreciated that the foregoing embodiments are provided for illustrative purposes only and are not to be in any way construed as limiting the present invention.

The invention claimed is:

1. A dust filter assembly attachable to outer surfaces of office machines, comprising:
    a contact plate attached to a vent hole of an office machine and sealing the periphery of the vent hole, wherein the contact plate is provided at a rear side of the filter assembly with a sealing wing having a thickness gradually decreasing towards an edge of the contact plate;
    a filter case connected to the contact plate and having a filter accommodation space therein; and
    a filter received within the filter case and including a plurality of layers, at least one of which is charged with static electricity.

2. The dust filter assembly of claim 1, wherein the contact plate is formed of ethylene propylene terpolymers (EPDM).

3. The dust filter assembly of claim 2, wherein the contact plate is press-fitted into the filter case.

4. The dust filter assembly of claim 2, wherein the contact plate is integrally formed with the filter case.

5. The dust filter assembly of claim 1, wherein the filter case is divided into a front case and a rear case, the front case and the rear case being press-fitted into each other.

6. The dust filter assembly of claim 5, wherein the front case is provided at a corner thereof with an L-shaped insertion protrusion extending towards the rear case, and the rear case is provided at a corner thereof with a mounting groove which receives the insertion protrusion.

7. The dust filter assembly of claim 6, wherein the rear case is provided at one side thereof with a coupling hole and the front case is provided at one side thereof with a pressing protrusion extending towards the rear case to be inserted into the coupling hole.

8. The dust filter assembly of claim 7, wherein the contact plate is integrally formed with the rear case by insert-injection molding.

9. The dust filter assembly of claim 1, wherein the sealing wing constitutes a closed cross-section and has an area gradually increasing towards a lower side of the contact plate.

10. The dust filter assembly of claim 1, wherein the contact plate includes an attachment member inside the sealing wing.

11. The dust filter assembly of claim 10, wherein the attachment member has a lower height than the sealing wing.

12. The dust filter assembly of claim 11, wherein the attachment member is formed of at least one selected from among bonding agents, adhesives, double-sided tapes, and magnets.

* * * * *